United States Patent [19]
Pelletier

[11] 4,022,336
[45] May 10, 1977

[54] APPARATUS FOR CONVEYING BULK MATERIAL

[76] Inventor: Henri Pelletier, 11 Avenue de Versailles, 93220 Gagny, France

[22] Filed: Mar. 1, 1976

[21] Appl. No.: 662,733

[30] Foreign Application Priority Data
Mar. 6, 1975  France .............................. 75.07062

[52] U.S. Cl. ............................ 214/44 R; 193/2 D; 185/4
[51] Int. Cl.² ....................................... B65G 67/24
[58] Field of Search .................. 214/41, 44 R, 1 R; 193/2 D; 185/4, 6, 27, 32; 60/639, 640, 407, 412

[56] References Cited
FOREIGN PATENTS OR APPLICATIONS
801,955  5/1936  France .............................. 193/2 D

*Primary Examiner*—Albert J. Makay
*Attorney, Agent, or Firm*—Brisebois & Kruger

[57] ABSTRACT

This invention relates to apparatus for conveying bulk materials, such as minerals, down a vertical or steeply inclined path of descent. An endless conveyor carries the material downwards by gravity, and at the same time drives an energy transformation unit, such as an electrical generator. The conveyor also drives an air compressor, which feeds compressed air to a reservoir. Air from the reservoir can drive a turbine for maintaining the speed of rotation of the generator in the event of a decrease in the conveyor speed. The speed may be monitored by a govenor. The compressed air may also drive apparatus for excavating the minerals. The material may be delivered to the conveyor by a succession of trucks on a circular track layout, which is inclined to the horizontal, the trucks moving towards the conveyor under gravity.

7 Claims, 4 Drawing Figures

APPARATUS FOR CONVEYING BULK MATERIAL

This invention relates to apparatus for conveyance of material in bulk enabling a portion of the potential energy of this material to be recovered over a vertical or steeply inclined path of descent.

Certain mines have never been hitherto exploited, because, independent of the richness of their minerals, evaluated cost of transport of these minerals as far as the processing installations is too high. This is especially the case with certain opencast mines located in mountain ranges for which the transport of the cut mineral in a conventional manner considerably increases the cost of exploitation.

Erection of hydroelectric dams of the earth dam or dike dam type, in which the building of the dike necessitates putting in position a large quantity of material, has often been ruled out because of its high total cost, mainly due to the transport of this material.

Devices for the transport of material are already known which function apparently without supply of energy, in which full buckets or cars displace their homologues which have just been emptied. As an example may be cited the discharge roundabouts of trucks on circular tracks on a plane slightly tilted with respect to the horizontal, such as are often encountered in mining installations.

Also known are ropeways having two buckets operating in an alternating manner; lifting of a bucket conveying a useful load is obtained by loading the other bucket with a quantity of water the mass of which is slightly greater than that of the useful load to be conveyed.

An object of the present invention is to provide apparatus for conveyance of material in bulk, which not only functions without it being necessary to supply energy to it, but further enables partial recovery of the potential energy which is liberated by the material during its path of descent.

In accordance with the present invention, apparatus for conveyance of material in bulk over a path which is vertical or inclined steeply downwards comprises an endless conveyor chain bearing buckets or skips between a departure station and an arrival station located at an altitude lower than that of the departure station, the buckets or skips being full during their path of descent and empty during their upwards return path. The conveyor chain drives at least one motion take-off to an energy transformation unit.

The energy transformation unit, whilst braking the descent of the material in the buckets or skips, enables part of the potential energy liberated by the material to be recovered. It is preferably a machine for the production of electricity, i.e. a generator or an alternator, associated with an air compressor producing compressed air which is stored in a reservoir.

The compressed air from the reservoir is, in particular, intended for feeding an air turbine which may be coupled to the shaft of the electrical machine in the event of a falling off in its speed of rotation, but may also satisfy the compressed air needs of workings near the conveyor device.

It is advantageous to provide a regulator member for controlling the starting up of the air turbine when the speed of rotation of the motion take-off driving the shaft of the machine for production of electricity reaches a predetermined lower limit.

The departure station of the material conveyor apparatus in accordance with the present invention preferably includes a roundabout of cars on a circular track slightly tilted with respect to a horizontal plane, each of the buckets passing through the departure station being designed to cooperate with the bottom of a car in order to bring about automatic loading of the bucket with the contents of the car, the said bucket being likewise designed to cooperate with a device for releasing the car once it is empty, in order to enable the positioning of a succeeding full car.

Other advantages and improvements of the present invention will become apparent from the description which follows of an embodiment of the invention, described by way of example, with reference to the accompanying drawings, in which.

Figure 1:
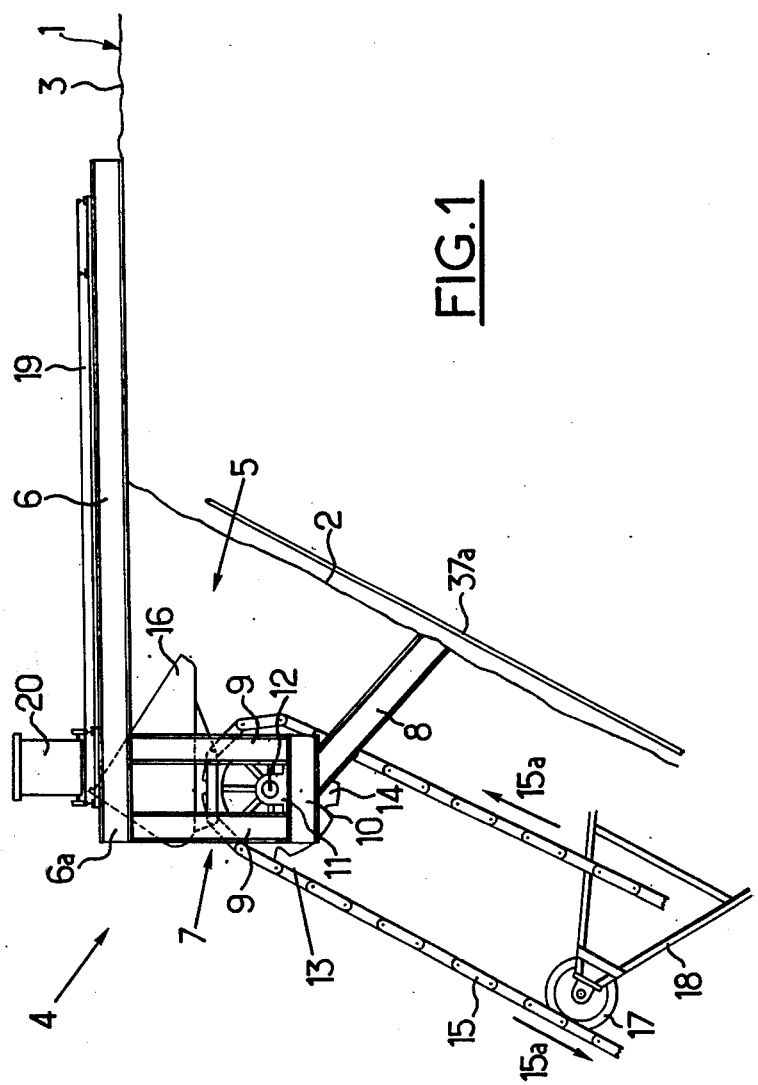
FIG. 1 is a diagrammatic view of a departure station of a material conveyor apparatus in accordance with the present invention.

FIG. 1 shows part of a mountain 1 having a very steep side 2 and a plateau 3 arranged for the installation of a departure station 4. A demountable metal frame 5 consisting of bolted heavy-section I-beams comprises a supporting platform 6 jutting out in an overhang from the plateau 3, to the bottom portion of which are welded two cradles 7 which in turn are supported by reinforcements 8 bearing against the side 2 of the mountain 1.

Each of the two cradles 7 consists of two vertical members 9 and a base 10 on to which is fixed a top bearing 11. In the bearing 11 is journalled a shaft 12 of a top drum 13 consisting of two cogwheels with which mesh two parallel endless chains 15 bearing, on the outside, buckets 16. The chain 15 is supported at regular intervals by supporting pulleys 17 carried by trestles 18 anchored in the side 2 of the mountain 1. The circulating motion of the chain 15 is indicated by arrow 15a.

On the platform 6 is provided a circular track 19 slightly tilted downwards with respect to the horizontal plane in the direction of the side 2 of the mountain 1, and passing substantially through the vertical through the top drum 13. On this circular track 19 cars 20 go round like a roundabout. Only one of the cars 20 is shown,, the car being in a position enabling it to be discharged into the bucket 16 which is shown.

Figure 2:
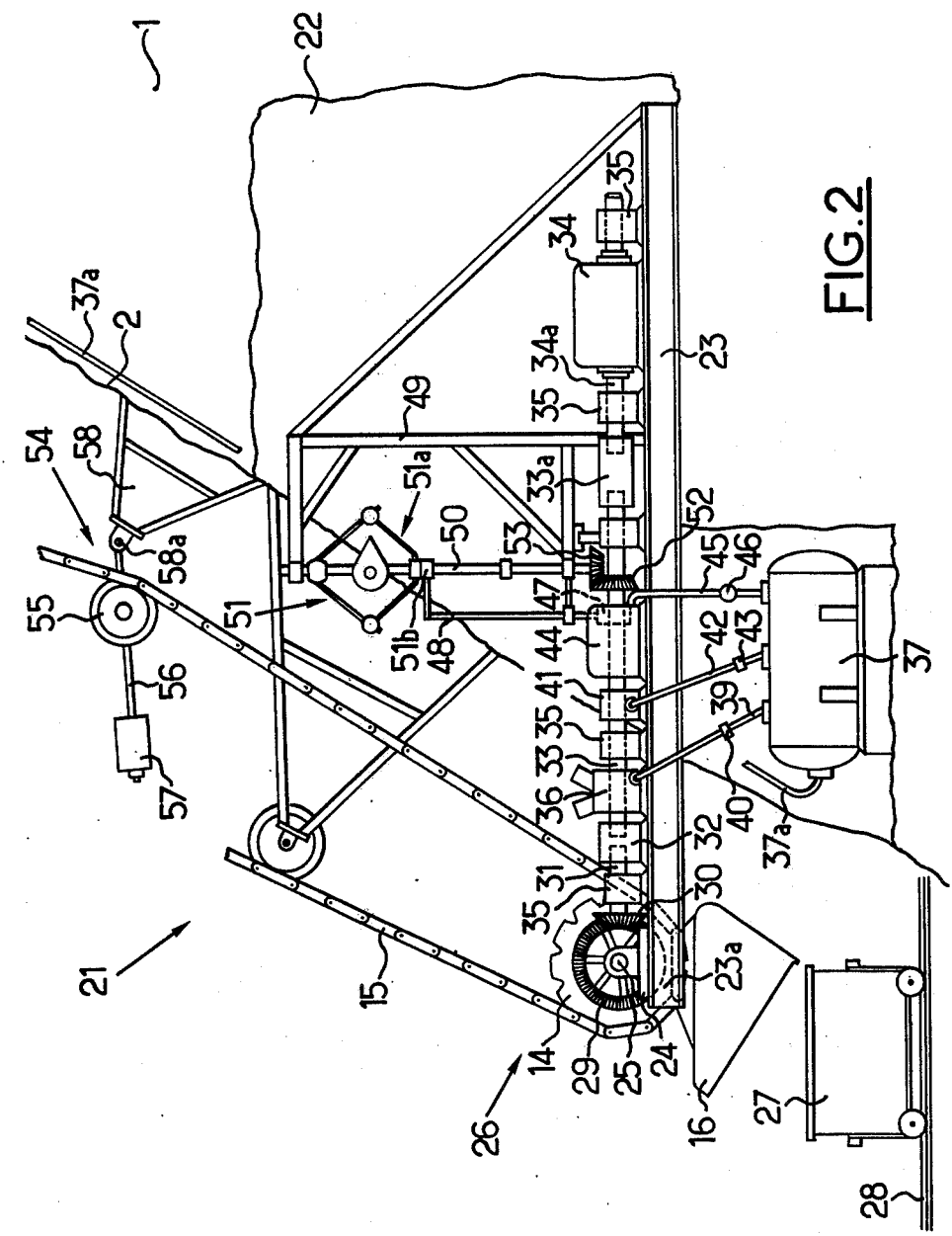
FIG. 2 is a diagrammatic representation of an arrival station which with FIG. 1 completes the apparatus.

FIG. 2 represents an arrival station 21 for the buckets 16 carried by the chains 15. Into a first excavation 22 made into the side 2 of the mountain 1 is anchored an overhanging horizontal bottom platform 23, formed from bolted heavy-section metal I-beams.

To the end of the overhang 23a of the platform 23 is attached a bottom bearing 24 in which is journalled a shaft 25 of a bottom drum 26, which drum comprises two cogwheels 14 identical to those of the top drum 13. The two chains 15 likewise mesh with the cogwheels 14 of the bottom drum 26.

A bucket 16 can be seen, attached to the two chains 15, in its position of discharge into a bottom car 27 running on a track 28. The capacity of the cars 27 is larger than that of the top cars 20.

On to one cogwheel 14 of the drum 26 is attached a gear crown wheel 29 concentric with the shaft 25. A bevel pinion 30 provided integral with a shaft 31 cooperates with the crown wheel 29 in order to effect a rotary motion take-off from the circulation of the chains 15. The shaft 31 is the input shaft to a gearbox 32, the output shaft of which is a shaft 33. This shaft 33 is connected to a shaft 34a of a rotary electrical machine 34 by means of a coupling sleeve 33a which can absorb possible variations in length of the two shafts 33 and 34a. The machine 34 is attached to the platform 23. The three shafts 31, 32 and 34a are supported in five identical axial bearings 35.

The shaft 33 drives a compressor 36, attached to the bottom platform 23, for providing compressed air to a storage tank 37 (shown for convenience in an excavation 38) through pipework 39 provided with a non-return valve 40.

A brake 41 operated by compressed air is provided on the shaft 33. It is connected by pipework 42, provided with a valve 43, to the compressed air tank 37. This brake 41 should enable the circulation of the buckets 16 to be stopped in case of necessity.

An air turbine 44 is also provided for driving the shaft 33 in rotation, the turbine being connected to the tank 37 by pipework 45 provided with a valve 46. The air turbine 44 has a slide 47 for admission of air, which is normally in the closed position and may be pulled up into an open position by a control rod 48. A bracket 49 fixed to the platform 23 supports a shaft 50 of a ball governor 51. A pair of bevel pinions 52 and 53 integral, respectively, with the shaft 33 and the shaft 50 effects coupling between the shafts. The rod 48 can carry out a translatory vertical motion in response to the mean position of a movable sleeve 51a of the govenor 51 by means of a sleeve 51b which is free to slide on the shaft 50.

The opening direction of the slide 47 corresponds with a downwards movement of the mean position of the movable sleeve 51a of the govenor 51. The action of the govenor 51 and of the air turbine 44 thus enables a possible falling off in the speed of rotation of the driving shaft 34a of the electrical machine 34 to be limited.

Finally in FIG. 2 is seen a tension regulator device 54 for the chains 15. A pulley 55 is attached to a lever 56 provided with an adjustable counterweight 57, the lever 56 being mounted to pivot in a vertical plane about a shaft 58a carried by a trestle 58 anchored in the side 2 of the mountain 1.

Figure 3:
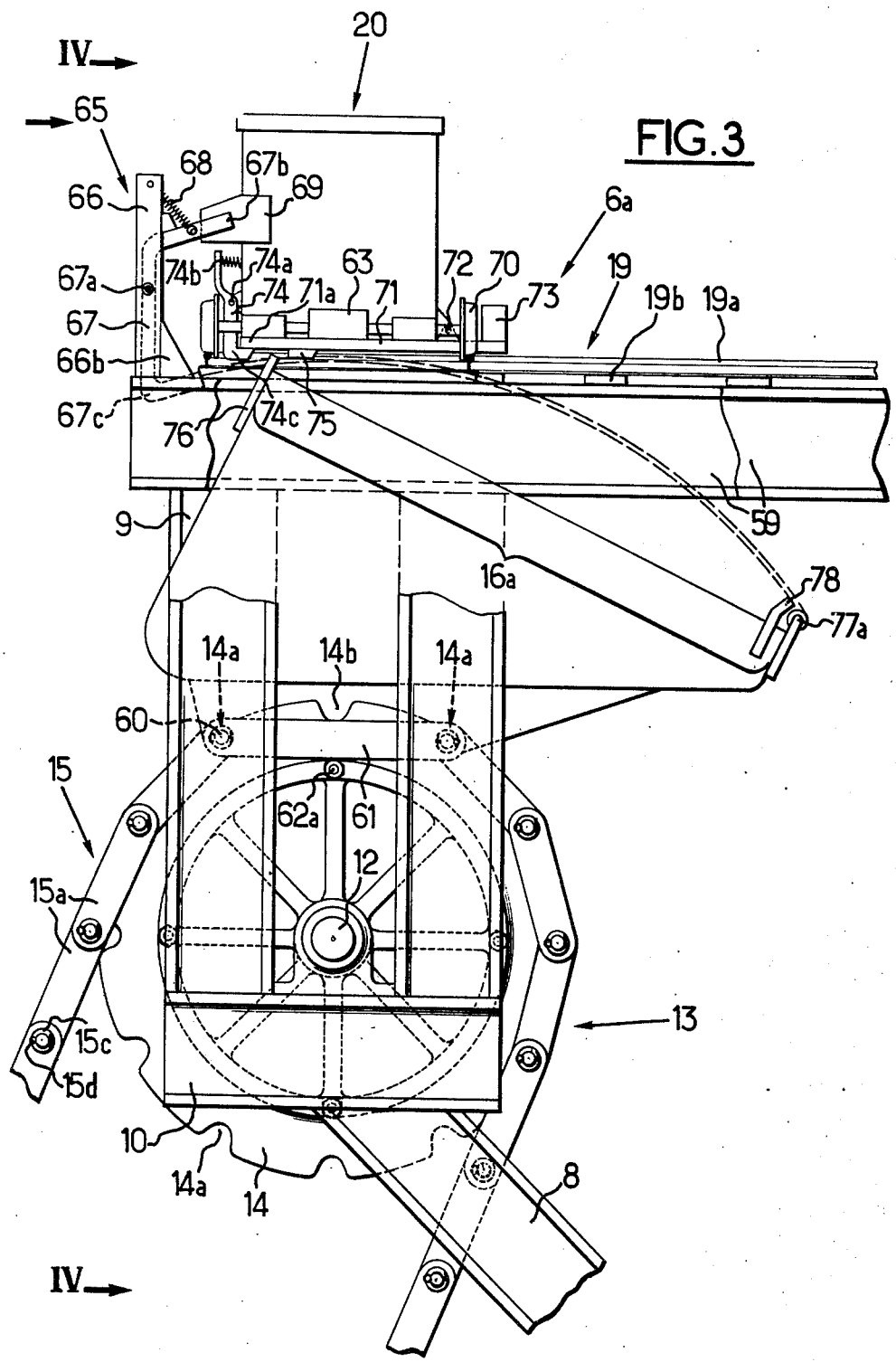
FIG. 3 is an enlarged detail of a portion of FIG. 1.
Figure 4:
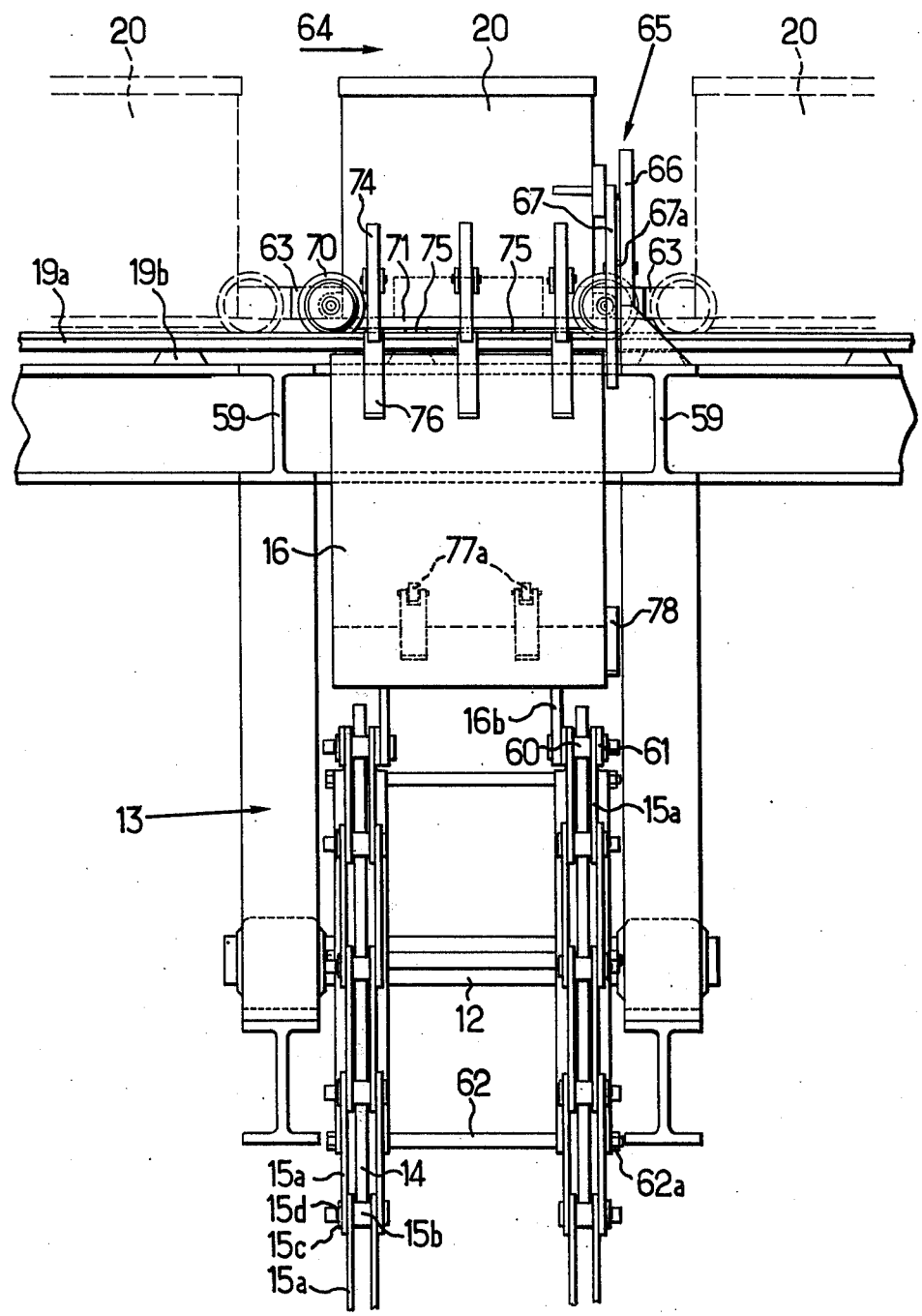
FIG. 4 is a side view in the direction of arrows IV—IV in FIG. 3.

FIGS. 3 and 4 show in detail the overhanging end 6a of the top platform 6. It comprises two master beams 59 leaving free passage to the buckets 16 carried by the chains 15. To the bottom portion of each of the master beams 59 are attached the two uprights 9 connecting the base 10 supported by reinforcements 8, as previously described with reference to FIG. 1.

In FIG. 3, partial cutting-away of the nearer beam 59 and its two uprights 9 has been carried out in order to enable the shape of the bucket 16 to be seen better. The chain 15 consists of short links 15a hinged by shouldered pins 15b (FIG. 4) each passing through four short links 15a. Attachment of the shouldered pins 15b is ensured by an assembly of a washer 15c and a pin 15d. The length of the short links 15a corresponds with the pitch of the notches 14a in the cogwheels 14. Four pins 60, longer than the pins 15b, are provided for integrating each of the buckets 16 with the chain 15, which at this point comprises long links 61.

The bucket 16 is produced from welded plate with a substantially triangular lateral shape. This shape enables the bucket both to be easily loaded with material through a long top opening 16a and to retain the loaded material during the subsequent path of descent, the opening 16a then being substantially in a horizontal position. Two ribs 16b at the bottom of the bucket 16 ensure its rigidity. With two long pins 60 passing through each of them, these two ribs 16b cooperate with the long links 61 to attach the bucket 16 to the chain 15. When a bucket 16 passes over the cogwheel 14, one notch 14b in the wheel remains unused, the pitch between the long pins 60 which cooperate with the notches 14a into which they mesh increasing the stability of the bucket during its loading.

From FIGS. 3 and 4 it can be seen that the top drum 13, built round the shaft 12 and comprising two cogwheels 14, is simply completed by four ties 62 between the cogwheels 14, fixed by nuts 62a.

The track 19, which is carried by the top platform 6 and in particular by the beams 59, consists of two circular rails 19a supported by crosspieces 19b. The cars 20 run one behind the other on the track 19, the cars 20 pushing against each other mutually at the level of their buffers 63 in a circular motion indicated by an arrow 64 (FIG. 4), the full cars pushing along the empty cars because of the slight tilt of the track 19 in the direction of the overhang of the platform 6.

The motion of the cars 20 is interrupted by the presence of a stop device 65, comprising a post 66 welded on to the beam 59 shown partly cut away in FIG. 3. A C-shaped lever 67 is hinged about a pin 67a embodied in the post 66. The C-shaped lever 67 is pulled upwards by a coil spring 68, and normally bears against a stop 66b on the post 66. A stopplate 69 welded on to the front of the car 20 comes to bear against the upper arm 67b of the lever 67. Each car 20 is provided with wheels 70 which are deliberately offset towards the front and back in order to allow tilting of the bottom 71 of the car in a transverse direction about a shaft 72 longitudinal to the car 20. A counterweight 73 of mass sufficient to bring the bottom 71 of the car 20 back into the horizontal position is provided on the opposite side of the shaft 72. Three latches 74 are arranged on the side face opposite to that of the counterweight 73, the latches being pivoted respectively, about three pins 74a and being kept in the closed position by springs 74b in order to retain the bottom 71 closed. A nose 74c of each latch is slightly oblique in order to enable it to move aside against the action of the spring 74b as the end 71a of the bottom of the car passes by the latch during a closing movement of the bottom 71. The arrangement of the three latches 74 can be seen more especially in FIG. 4.

Two bosses 75 made from welded plate are provided on the underside of the bottom 71 of each of the cars 20. They occupy a mean position in planes perpendicular to the direction of advance of the cars, between the three latches 74. Three lugs 76 are welded on to the front portion of the bucket 16, projecting beyond the opening 16a of the bucket at right angles to the noses of the latches 74c. The lugs 76 project by a length sufficiently great to retract the noses 74c of the latches 74, which allows tilting down of the bottom 71 of the car 20 due to the weight of material contained in it. When the car 20 has thus been unloaded, the bottom 71 rises again under the action of the counterweight 73, pushing aside the noses 74c of the latches. The subsequent motion of the bucket 16 brings into contact with the bosses 75 two rollers 77a which project beyond the opening 16a of the bucket at the rear portion of the bucket.

The travel of a metal finger 78, welded to the rear portion of the bucket 16, into contact with the lower arm 67c of the C-shaped lever 67 brings about lowering of the arm 67b of this lever from in front of the stop-plate 69 on the car 20, which enables the car to move forward and make way for the next car. The stop-plate 69 of the next car then meets the arm 67b of the lever 67, which has returned to its original position under the return action of the spring 68. The new car 20 then waits to be unloaded by the next bucket 16.

The apparatus for conveyance of material in bulk, comprising the departure station 4 and the arrival station 21 connected by the two endless chains 15 bearing the buckets 16, functions by virtue of the potential energy set free by the material leaving the departure station 4 and arriving at the arrival station 21. The material is loaded into the buckets 20 with a mass of material as accurate as possible substantially opposite the overhang of the departure station 4. The buckets 16 are loaded automatically with the contents of a car 20 upon passing through the departure station 4, and cause the arrival of a car 20 behind the next bucket 16. The motion, shown by the arrows 15a, of the chain 15 bearing the buckets 16 is due to the presence of the material loaded into the descending buckets which are emptied into the cars 27 in the arrival station 21. The machine 34 for production of electricity, driven by the successive shafts 31, 33 and 34a ensures braking of the motion of the chain 15 whilst producing electricity. A braking function is likewise achieved by the compressor 36, the compressed air production of which may, if necessary, be turned to account to increase the speed of rotation of the shaft 34a of the machine 34 in the event of a drop in speed. This governing of the speed is effected by means of the air turbine 44, the action of which is subordinated to the measurement of the speed of rotation of the shaft 33 by the ball governor 51.

The material unloaded into the cars 27 may be taken to a processing plant if the material comprises minerals. A dike-building machine may be fed directly by the unloading of the buckets 16 in order to enable continuous building of a dike intended for the production, for example, of a dike dam.

Excavation of the material transported in bulk by the buckets 16 may be carried out pneumatically, thanks to the compressed air stored in the tank 37 and routed by a pipe 37a up to the level of the departure station 4. The creation of a flat excavated zone at the level of the departure station 4, especially during use of the conveyor apparatus of the present invention for the construction of the dike of a dam, may enable subsequently the installation of a solar energy transformation unit.

In the case of exploitation of mines in a mountainous situation, it is perfectly conceivable to ensure, with the conveyor apparatus of the present invention, the transport of the minerals as far as their processing plants located lower down, as well as transportation of the deads cut at the same time as the mineral, to the extent that these do not present any disadvantage of storage once they have arrived at their destination.

The whole of the conveyor apparatus which is the object of the present invention is designed to be demountable so that it can be reused at a different site. This is especially the case when the apparatus has been set to work for the building of a first dike dam and the building of a second is projected.

I claim:

1. Apparatus for conveyance of bulk material, such as minerals, over a vertical or steeply inclined path, comprising an endless conveyor bearing buckets between a departure station and an arrival station located at a lower altitude than the departure station, the buckets being, in use of the apparatus, full during their descent and empty during their upwards return; motion take-off means driven by the conveyor and coupled to an energy transformation unit; a compressed air reservoir; an air compressor for feeding the compressed air to the reservoir and driven by the motion take-off means; and an air turbine operable by compressed air from said reservoir and associated with the energy transformation unit to govern the speed of rotation of a shaft of said unit.

2. Apparatus as claimed in claim 1, in which the energy transformation unit and the air compressor are located at the arrival station.

3. Apparatus as claimed in claim 1, in which the energy transformation unit comprises an electrical generator.

4. Apparatus as claimed in claim 1, including control means for starting up the air turbine when the speed of rotation of the motion take-off falls to a predetermined lower limit.

5. Apparatus as claimed in claim 4, including a governor for monitoring the speed of rotation of the motion take-off.

6. Apparatus as claimed in claim 1, in which the departure station includes a roundabout of cars on a circular railtrack slightly tilted with respect to the horizontal plane, each of the buckets being suitable for cooperating with the bottom of the cars in order to effect loading of the bucket with the contents of the car, the buckets also including means cooperating with a device for releasing the car after emptying, in order to allow the next car to take up its position.

7. Apparatus as claimed in claim 1, in which the conveyor comprises a pair of parallel endless chains.

* * * * *